US012338604B1

(12) United States Patent
Mahrenholz

(10) Patent No.: US 12,338,604 B1
(45) Date of Patent: Jun. 24, 2025

(54) INERTIAL LOAD DAMPENING HYDRAULIC SYSTEM WITH PERSISTENT OIL CONDITIONING

(71) Applicant: Deere & Company, Moline, IL (US)

(72) Inventor: John R. Mahrenholz, Dubuque, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 18/901,794

(22) Filed: Sep. 30, 2024

(51) Int. Cl.
*E02F 9/12* (2006.01)
*E02F 9/22* (2006.01)
*F15B 9/14* (2006.01)

(52) U.S. Cl.
CPC ............ *E02F 9/123* (2013.01); *E02F 9/2207* (2013.01); *E02F 9/2214* (2013.01); *E02F 9/2296* (2013.01); *F15B 9/14* (2013.01); *F15B 2211/20546* (2013.01); *F15B 2211/611* (2013.01); *F15B 2211/615* (2013.01); *F15B 2211/62* (2013.01)

(58) Field of Classification Search
CPC ......... E02F 9/123; E02F 9/128; E02F 9/2203; E02F 9/2214; F15B 7/006; F15B 7/008; F15B 9/14; F15B 2211/20546; F15B 2211/611; F15B 2211/615; F15B 2211/62
See application file for complete search history.

(56) References Cited

U.S. PATENT DOCUMENTS 4,030,623 A 6/1977 Bridwell et al.
4,344,733 A * 8/1982 Hirsch ...................... E02F 3/32 91/395
4,470,259 A 9/1984 Miller et al.
4,838,756 A 6/1989 Johnson et al.
5,419,129 A 5/1995 Becker et al.
5,673,605 A 10/1997 Chung
6,422,804 B1 7/2002 Gitter
8,167,081 B2 5/2012 Byrd et al.
8,850,806 B2 10/2014 Zhang et al.
9,249,879 B2 * 2/2016 Ishikawa ............. F16H 61/4061
10,221,870 B2 3/2019 Goedken et al.
10,982,761 B2 * 4/2021 Mitsui ..................... F15B 7/006
2004/0187491 A1 * 9/2004 Whitaker ................ F04B 53/16 60/476

(Continued)

OTHER PUBLICATIONS

HYDAC Innovative Fluid Power "Pressure Sensing Valves," pp. 97, 98 (2 pages).

*Primary Examiner* — Michael Leslie
(74) *Attorney, Agent, or Firm* — Tucker Ellis LLP

(57) ABSTRACT

A hydraulic system is provided with a pump supplying pressurized hydraulic fluid through a first supply line to a closed center control valve. From the control valve the fluid is directed through work lines to a hydraulic motor. Exhausted hydraulic fluid from the hydraulic motor is directed through the control valve to an exhaust line having a back pressure check valve set at a first pressure level. To keep the exhaust line fully charged a second supply line extends between the first supply line and the exhaust line. The second supply line is provided with a pressure reducing valve that is set at a second pressure level that is greater than the first pressure level of the back pressure check valve. An oil conditioning circuit is disposed between the back pressure check valve and a return tank for persistent hydraulic fluid conditioning.

11 Claims, 3 Drawing Sheets

(56) References Cited

U.S. PATENT DOCUMENTS

| | | | |
|---|---|---|---|
| 2011/0061755 | A1 | 3/2011 | Hanakawa et al. |
| 2011/0154815 | A1 | 6/2011 | Lee |
| 2014/0020370 | A1 | 1/2014 | Berg |

* cited by examiner

INERTIAL LOAD DAMPENING HYDRAULIC SYSTEM WITH PERSISTENT OIL CONDITIONING

FIELD

The subject disclosure relates to inertial load dampening hydraulic systems with persistent oil conditioning. Although the examples will be described herein in connection with such hydraulic systems for work vehicles, it is to be appreciated that the subject disclosure has broader application including non-vehicle machine applications.

BACKGROUND

Hydraulic motors in the form of rotary motors and linear hydraulic cylinders are used to move large bodies resulting in large inertial forces. Abating these large inertial forces has been problematic, particularly as the moving large bodies are to be stopped quickly. Typically, as the load is being stopped, oil on one side of the motor is forced over relief, and oil on the other side of the motor experiences cavitation. Fluid is directed to the cavitating side through anti-cavitation valves. In some systems the anti-cavitation valves may provide insufficient fluid to supply the cavitating side of the motor resulting in generation of noise and possible oscillation of the load as it is stopped. Insufficient fluid supplied to the cavitating side of the motor as the load is being stopped also results in unnecessary heating of the hydraulic oil.

One example of a mechanism that may experience this cavitation problem is a hydraulic system controlling swing movement of a cab and boom of an excavator. Excavators are typically provided with a pivotal boom attached to a cab portion that is in turn attached to the vehicle chassis via a swing frame. The swing frame is provided with a vertical pivot for pivoting the boom carried on the cab about a vertical axis relative to the vehicle chassis. In applications of this type the cavitation discussed above is induced or otherwise occurs as the cab and boom are swung and quickly stopped thereby mechanically back-driving a hydraulic motor coupled with the swing frame. This heats the hydraulic oil, generates noise, and possibly causes oscillation in the boom and cab. These conditions are caused by return fluid from the hydraulic rotary motor being forced over the relief valves at high pressure as the closed center control valve closes. At the same time the supply side of the hydraulic rotary motor experiences a loss of fluid or cavitation. The high pressure developed on the return fluid side of the hydraulic rotary motor now forces the cab and boom back towards the cavitated side now building up pressure in that side. The newly generated pressure then pushes the other side of the rotary motor. This oscillating movement continues until the swing energy is dissipated and the oscillatory cab and boom motion stops.

In addition to the undesirable noise and oscillations caused by the cavitation problem described above, the nature of typical hydraulic rotary motor circuits that are operated using anti-cavitation and closed center control valves imposes limitations on opportunities to condition the hydraulic oil such as for example to cool and/or filter the oil. Hydraulic oil flows through such systems only while the hydraulic motor is operated. While the hydraulic motor is inactive, however, no oil flows through the system even when a source providing pressurized hydraulic fluid to the motor such as for example a hydraulic variable displacement pump may be actively operating. Therefore, oil conditioning devices disposed in an exhaust line downstream of the closed center control valve in such systems are wholly ineffective at conditioning the fluid during periods of swing motor inactivity.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter. that can operably couple wit The embodiments herein are directed to hydraulic systems that provide improved inertial load dampening, while also providing persistent hydraulic oil conditioning.

In accordance with an aspect, a hydraulic system is provided for dampening the high inertia forces generated by a body being driven by a hydraulic motor. The hydraulic system includes a source of pressurized hydraulic fluid, a first supply line coupled to the source of pressurized hydraulic fluid, a control valve coupled with the first supply line, a work line coupling the control valve with the hydraulic motor, an exhaust line coupled with the control valve wherein the exhaust line is operable to return exhaust fluid to the source of pressurized hydraulic fluid via a return tank, a back pressure check valve located in the exhaust line wherein the back pressure check valve is set at a first pressure level, an anti-cavitation valve hydraulically positioned between the exhaust line and the work line, an oil conditioning circuit located in the exhaust line between the back pressure check valve and the return tank, a second supply line extending between the first supply line and the exhaust line, and a pressure reducing valve hydraulically located in the second supply line wherein the pressure reducing valve is set at a second pressure level. In the hydraulic system the second pressure level of the pressure reducing valve is greater than the first pressure level of the back pressure check valve thereby permitting hydraulic fluid to flow through the oil conditioning circuit during periods of operation of the source of pressurized hydraulic fluid.

In any of the embodiments herein, the hydraulic system further includes a flow control orifice disposed in the second supply line, wherein the flow control orifice is operable to control a flow rate of hydraulic fluid flowing through the second supply line and through the oil conditioning circuit.

In any of the embodiments herein, the hydraulic system includes an oil conditioning circuit that includes a fluid filter device located in the exhaust line between the back pressure check valve and the return tank.

In any of the embodiments herein, the hydraulic system includes an oil conditioning circuit that includes a fluid cooler device located in the exhaust line between the back pressure check valve and the return tank.

In any of the embodiments herein, the hydraulic system further includes a cooler bypass check valve hydraulically coupled in parallel with the fluid cooler device, wherein the cooler bypass check valve provides a path for hydraulic oil to bypass the filter device.

In any of the embodiments herein, the hydraulic system includes a cooler bypass check valve that is set to a pressure greater than the second pressure level of the reducing valve.

In any of the embodiments herein, the source of pressurized hydraulic fluid of the hydraulic system is a pump.

In any of the embodiments herein, the hydraulic system includes a control valve comprising a closed center valve.

In any of the embodiments herein, the hydraulic system further includes a pressure relief valve hydraulically mounted in parallel with the anti-cavitation valve.

In any of the embodiments herein, the hydraulic system includes a hydraulic motor that includes one or more of a hydraulic rotary motor, and/or a double acting hydraulic cylinder.

In any of the embodiments herein, the source of hydraulic fluid of the hydraulic system includes a variable displacement pump.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

BRIEF DESCRIPTION OF THE DRAWINGS

In the accompanying drawings which are incorporated in and constitute a part of the specification, embodiments of the disclosure are illustrated, which, together with a general descriptions given above, and the detailed description given below, serve to exemplify the embodiments of this disclosure.

DETAILED DESCRIPTION

Figure 1:
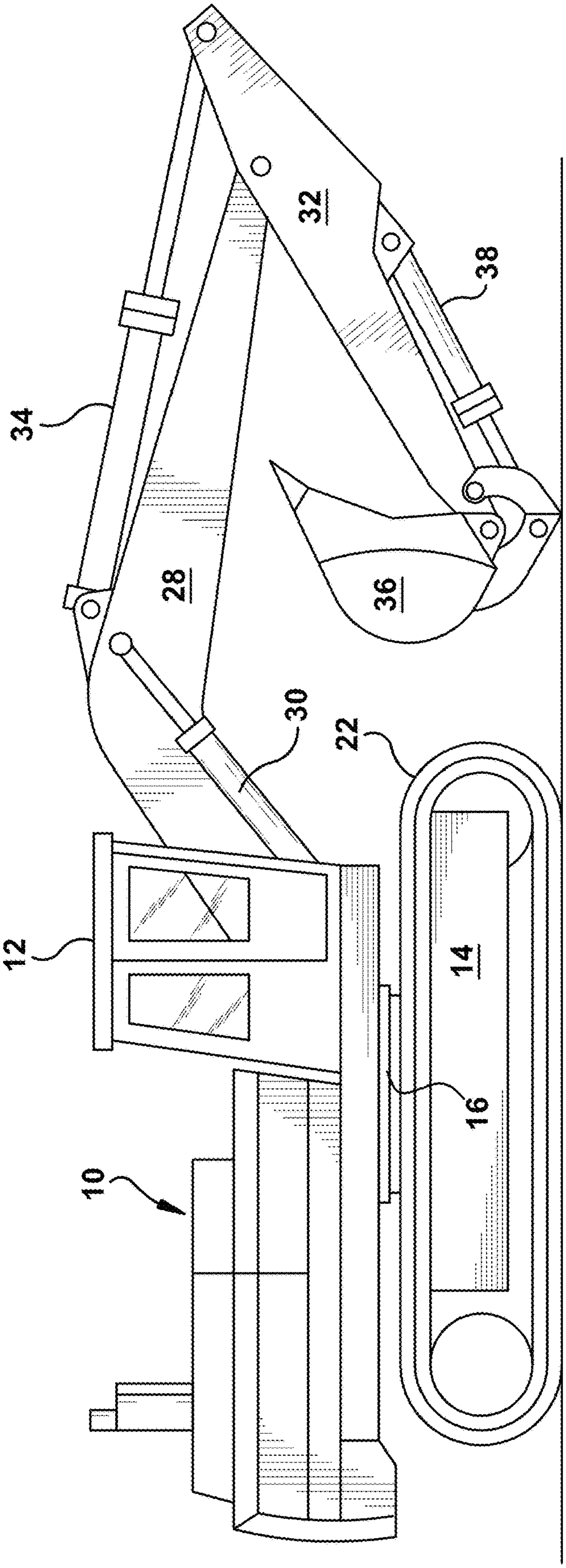
FIG. 1 is a side view of an implementation that includes a hydraulic system in accordance with an example embodiment.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram and/or schematic form in order to facilitate describing the claimed subject matter.

For the purposes of promoting an understanding of the principles of the present disclosure, reference will now be made to the embodiments described herein and illustrated in the drawings and specific language will be used to describe the same. It will nevertheless be understood that no limitation of the scope of the present disclosure is thereby intended, such alterations and further modifications in the illustrated devices and methods, and such further applications of the principles of the present disclosure as illustrated therein being contemplated as would normally occur to one skilled in the art to which the present disclosure relates.

The example implementation is embodied in an excavator 1 that is shown generally in FIG. 1. The excavator 1 includes a main body 10, having an operator's cab 12 at one end and mounted on an undercarriage 14 by means of a swing pivot 16. The body 10 is rotatable through a full circle relative to the undercarriage 14 on the pivot 16. The swinging of the body being accomplished by a hydraulic motor 18 (FIGS. 2 and 3) that drives a gear train (not shown) engageable with a large ring gear (not shown) in the pivot mechanism to rotate the body 10.

Undercarriage 14 includes a pair of tracks 22 on opposite sides of the undercarriage, and the respective tracks are driven by hydraulic motors (not shown) through respective clutches (not shown) and reduction gearing (not shown) in a well-known manner.

The excavator 1 includes a large boom 28 that extends from the body 10 and is swingable in a vertical arc by actuation of a pair of boom cylinders 30. A dipper stick or arm 32 is swingably mounted on the outer end of the boom and its position is controlled by a hydraulic cylinder 34. At the lower end of the dipper stick or arm 32, there is mounted a conventional excavator bucket 36 that is swingable relative to the arm 32 by means of a hydraulic cylinder 38. All of the above represents more or less conventional construction. The control of the hydraulic motor 18 using an inertial load dampening hydraulic system in accordance with an example embodiment will be described below together with the showings of FIGS. 2 and 3.

Figure 2:
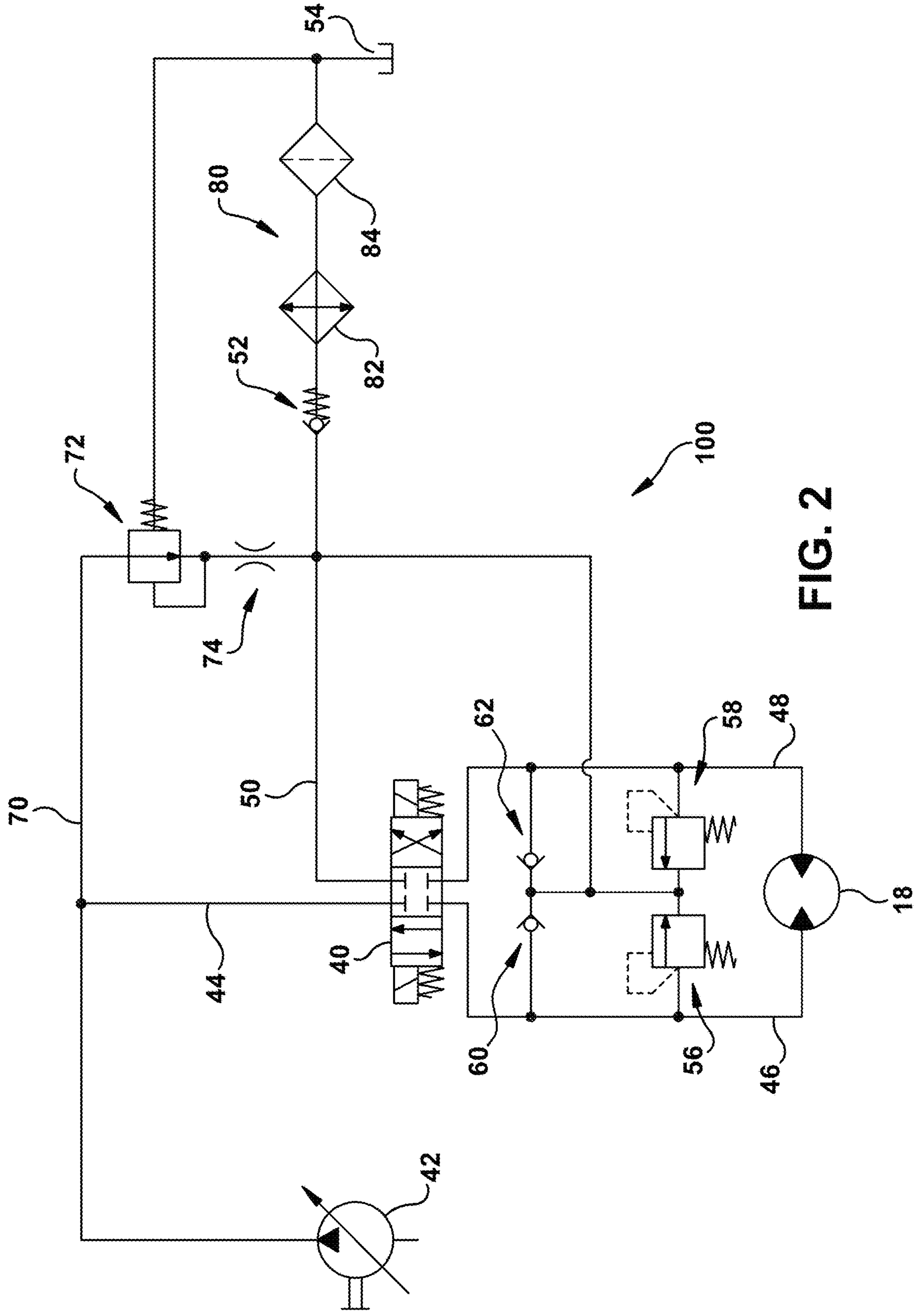
FIG. 2 is a hydraulic schematic of a hydraulic system in accordance with an example embodiment.

Turning first to FIG. 2, a hydraulic system 100 includes a hydraulic motor 18 that is operable to pivot the cab 12 and boom 28 relative to the supporting undercarriage 14 about a vertical axis defined by the vertical pivot 16. The position of the cab 12 and boom 28 relative to the undercarriage 14 is controlled by a three position control valve 40. The control valve 40 has a right swing position, a left swing position, and a stationary position. The control valve 40 is shown in its stationary position for the purpose of illustration. Pressurized hydraulic fluid from a source of pressurized hydraulic fluid 42 is coupled to the control valve 40 by a first supply line 44. In the illustrated embodiment the source of pressurized hydraulic fluid is a variable displacement pump as shown diagrammatically. The control valve 40 in turn is hydraulically coupled to the hydraulic swing motor 18 by first and second work lines 46 and 48. Pressurized and exhausted hydraulic fluid passes through the work lines 46 and 48. Exhausted hydraulic fluid from the swing motor 18 passes through the control valve 40 to exhaust line 50. The exhaust line 50 is provided with a back pressure check valve 52 which has a first pressure level. If the pressure is less than this first pressure level, the back pressure check valve 52 is closed. If the pressure exceeds this first pressure level, the back pressure check valve 52 opens and hydraulic fluid is exhausted back to tank 54 where it is returned to the pump 42.

In one example the back pressure check valve is set at 3 bar. If the pressure is less than 3 bar, the back pressure check valve 52 is closed. If the pressure exceeds this first pressure level of 3 bar, the back pressure check valve 52 opens and hydraulic fluid is exhausted back to tank 54 where it is returned to the pump 42.

Each side of the swing motor 18 is also provided with a pressure relief valve 56 and 58 and an anti-cavitation valve 60 and 62. The pressure relief valve 56 is coupled in parallel with anti-cavitation valve 60. Both of these valves 56 and 60 are hydraulically positioned between work line 46 and exhaust line 50. Similarly, the pressure relief valve 58 is coupled in parallel with anti-cavitation valve 62. Again, both of these valves 58 and 62 are hydraulically positioned between work line 48 and exhaust line 50.

A second supply line 70, a pressure reducing valve 72, and a flow control orifice 74 are provided. The second supply line 70 extends between the first supply line 44 and the exhaust line 50. The flow of pressurized hydraulic fluid through this short circuit path is controlled by pressure reducing valve 72 and the flow control orifice 74. The pressure reducing valve 72 and the flow control orifice 74 are hydraulically positioned in the second supply line 70, and the pressure reducing valve 72 is set at a second pressure level that is related to the first pressure level of the back pressure check valve 52. In the example embodiment, the pressure reducing valve 72 is set at a second pressure level that is greater than the first pressure level of the back pressure check valve 52. In this way, the hydraulic oil is persistently conditioned whenever the source of pressurized hydraulic fluid 42 is energized by the flow of the fluid through an oil conditioning circuit 80 disposed between the back pressure check valve 52 and the tank 54. The flow control orifice 74 of the hydraulic system 100 is selected to control the flow rate of hydraulic fluid through the second supply line 70 and therefore also through the oil conditioning circuit 80 including at times when the three position control valve 40 is disposed in the stationary position as illustrated. The flow control orifice 74 is provided for presenting a controlled or otherwise tuned flow restriction in the short circuit path.

In an example embodiment, the oil conditioning circuit 80 includes a fluid cooler device 82 and a fluid filter device 84. The fluid cooler and filter devices 82, 84 may be disposed in a series connection between the back pressure check valve 52 and the tank 54. In this way, the subject hydraulic system 100 is operable to advantageously both condition the hydraulic fluid whenever the source of pressurized hydraulic fluid 42 is energized including during periods of swing motor inactivity, and to supply the hydraulic fluid to the cavitating side of the motor 18 in a rapid manner thereby minimizing noise due to cavitation and also thereby reducing heating of the hydraulic oil.

In the subject hydraulic system 100, enhanced inertial load dampening is provided by the placement of the second supply line 70 and the pressure reducing valve 72 extending between the first supply line 44 and the exhaust line 50. Also in the subject circuit, persistent oil conditioning is provided by the pressure reducing valve 72 being set at a second pressure level that is greater than the first pressure level of the back pressure check valve 52. The combination of enhanced inertial load dampening and persistent oil conditioning advantageously helps to reduce equipment failure and extends maintenance intervals, thereby providing for more efficient machine utilization.

In the example discussed above the pressure reducing valve 72 is set at 7 bar and the back pressure check valve 52 is set at 3 bar. Therefore, the pressure reducing valve 72 set at 7 bar is 4 bar greater than the 3 bar setting of the back pressure check valve 52. In this way the exhaust line 50 between the back pressure check valve 52 and the control valve 40 is maintained at a minimum pressure of 3 bar and at a maximum maintained pressure of 7 bar. Therefore, the back pressure on the anti-cavitation valves 60 and 62 is at the same pressure level in the exhaust line 50, and additional fluid from the exhaust line 50 can be supplied to the cavitating side of the hydraulic motor 18. By supplying the fluid to the cavitating side in a rapid manner the oscillation is dampened when stopping a large body abruptly.

Figure 3:
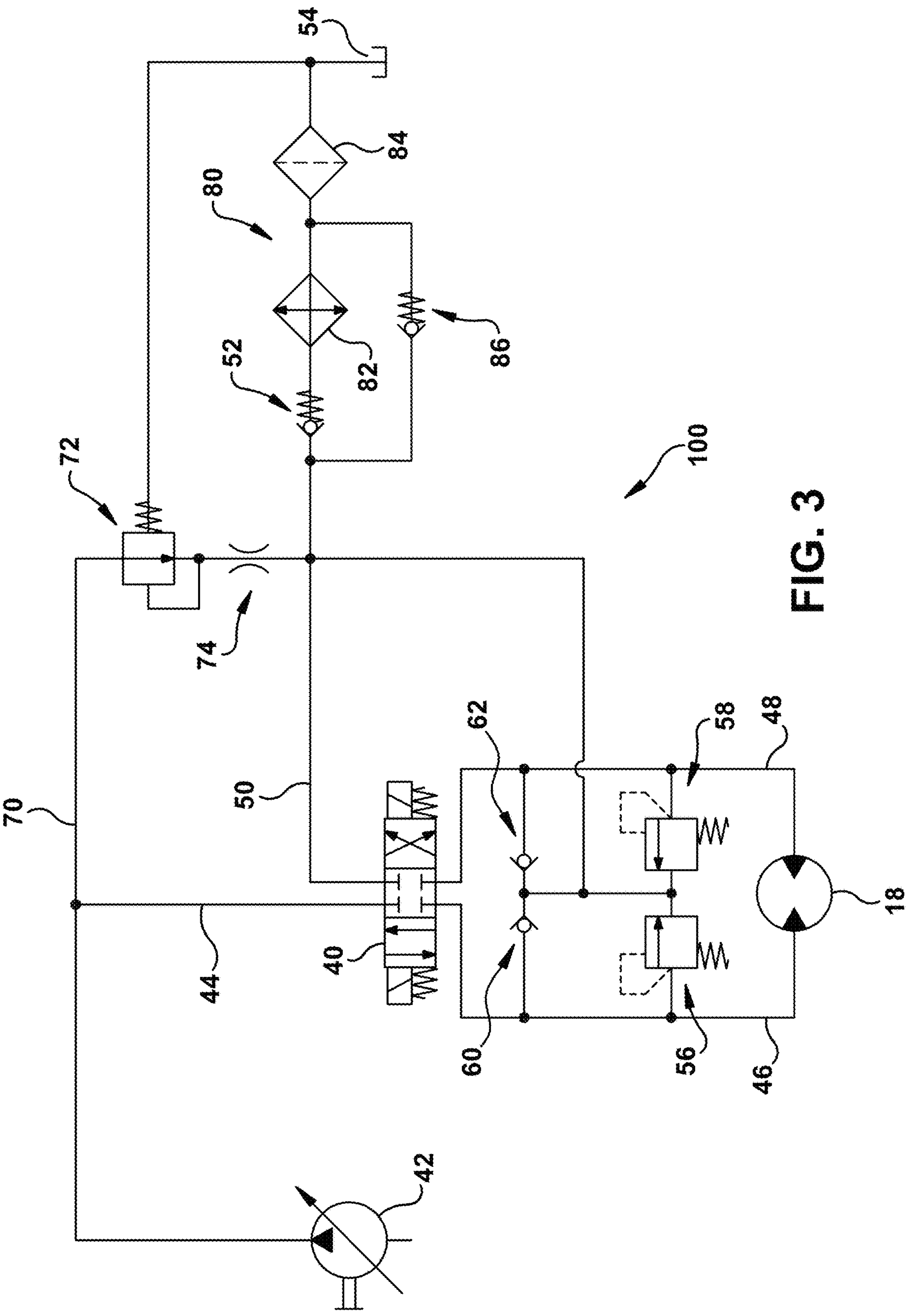
FIG. 3 is a hydraulic schematic of a hydraulic system in accordance with an example embodiment.

Turning next to FIG. 3, a hydraulic system 100' includes a hydraulic motor 18 that is operable to pivot the cab 12 and boom 28 relative to the supporting undercarriage 14 about a vertical axis defined by the vertical pivot 16. The hydraulic system 100' illustrated is the same in every way to the hydraulic system 100 shown in FIG. 2 but with the addition of a cooler bypass check valve 86. In the example illustrated, the cooler bypass check valve 86 is hydraulically coupled in parallel with the fluid cooler device 82. As shown, the cooler bypass check valve 86 provides a path for hydraulic oil to bypass the filter device 82. In the embodiment illustrated, the cooler bypass check valve 86 is set to a pressure greater than the pressure reducing valve 72. In a particular embodiment the cooler bypass check valve 86 is set to a pressure of about 8 bar. It is to be appreciated that the cooler bypass check valve 86 is especially beneficial during periods of cold weather operation and also during times when operation of the hydraulic system 100' is necessary despite the filter device 82 being at capacity, full, and/or clogged or damaged.

It is to be understood that other embodiments will be utilized and structural and functional changes will be made without departing from the scope of the claims. The foregoing descriptions of embodiments have been presented for the purposes of illustration and description. It is not intended to be exhaustive or to limit the embodiments to the precise forms disclosed. Accordingly, many modifications and variations are possible in light of the above teachings. It is therefore intended that the scope of the claims not be limited by this detailed description.

Described implementations of the subject matter can include one or more features, alone or in combination.

Additionally, in some implementations, the data can be collected at regular intervals (e.g., or continually) and curated into a remote operations center, and loaded to a database with spatial and temporal indexing capabilities. As one example, the data may be analyzed as it is collected for unload begin and end signals, and then, in combination with the location and time information, and the data records, determine which product transport container (e.g., grain cart or trailer) was positioned at a location at that time given known equipment dimensions and characteristics. In this example, once a match is identified, a "Virtual Load" record may be created or extended for the equipment receiving the load that contains pre-determined load metrics and characteristics, such as weight, volume, load time, condition of the product, and much more. As an example, this collection and curation of the data can be done automatically based on the load signals, location, and time match without need for operator intervention. Further, if the target transport container, such as a cart, already contains one or more portions of another load at the time of collection, the load quality information for all of the contained, partially filled loads can be aggregated together as appropriate for the circumstances.

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms “includes,” “having,” “has,” “with,” or variants thereof are used in either the detailed description or the claims, such terms are intended to be inclusive in a manner similar to the term “comprising.”

The implementations have been described, hereinabove. It will be apparent to those skilled in the art that the above methods and apparatuses may incorporate changes and modifications without departing from the general scope of this disclosure. It is intended to include all such modifications and alterations in so far as they come within the scope of the appended claims or the equivalents thereof.

What is claimed is:

1. A hydraulic system for dampening the high inertia forces generated by a body being driven by a hydraulic motor, the hydraulic system comprising:

- a source of pressurized hydraulic fluid;
- a first supply line coupled to the source of pressurized hydraulic fluid;
- a control valve coupled with the first supply line;
- a work line coupling the control valve with the hydraulic motor;
- an exhaust line coupled with the control valve, the exhaust line being operable to return exhaust fluid to the source of pressurized hydraulic fluid via a return tank;
- a back pressure check valve located in the exhaust line, the back pressure check valve being set at a first pressure level;
- an anti-cavitation valve hydraulically positioned between the exhaust line and the work line;
- an oil conditioning circuit located in the exhaust line between the back pressure check valve and the return tank;
- a second supply line extending between the first supply line and the exhaust line; and
- a pressure reducing valve hydraulically located in the second supply line, the pressure reducing valve being set at a second pressure level,
- wherein the second pressure level of the pressure reducing valve is greater than the first pressure level of the back pressure check valve thereby permitting hydraulic fluid to flow through the oil conditioning circuit during periods of operation of the source of pressurized hydraulic fluid.

2. The hydraulic system according to claim 1, further comprising:

- a flow control orifice disposed in the second supply line, the flow control orifice being operable to control a flow rate of hydraulic fluid flowing through the second supply line and through the oil conditioning circuit.

3. The hydraulic system according to claim 1, wherein the oil conditioning circuit comprises a fluid filter device located in the exhaust line between the back pressure check valve and the return tank.

4. The hydraulic system according to claim 1, wherein the oil conditioning circuit comprises a fluid cooler device located in the exhaust line between the back pressure check valve and the return tank.

5. The hydraulic system according to claim 4, further comprising:

- a cooler bypass check valve hydraulically coupled in parallel with the fluid cooler device, wherein the cooler bypass check valve provides a path for hydraulic oil to bypass the filter device.

6. The hydraulic system according to claim 5, wherein the cooler bypass check valve is set to a pressure greater than the second pressure level of the reducing valve.

7. The hydraulic system according to claim 1, wherein the source of pressurized hydraulic fluid comprises a pump.

8. The hydraulic system according to claim 1, wherein the control valve comprises a closed center valve.

9. The hydraulic system according to claim 1, further comprising a pressure relief valve hydraulically mounted in parallel with the anti-cavitation valve.

10. The hydraulic system according to claim 1 wherein the hydraulic motor comprises one or more of:

- a hydraulic rotary motor; and/or
- a double acting hydraulic cylinder.

11. The hydraulic system according to claim 1 wherein the source of hydraulic fluid comprises a variable displacement pump.

* * * * *